(12) United States Patent
Chen et al.

(10) Patent No.: US 6,429,921 B1
(45) Date of Patent: Aug. 6, 2002

(54) STRUCTURE OF A MULTI-LAYERED THIN FILM PROTECTIVE LAYER

(75) Inventors: Wei-Shiau Chen, Chin-Men Hsien; Kao-Su Huang, Tainan Hsien, both of (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 09/480,062

(22) Filed: Jan. 10, 2000

(30) Foreign Application Priority Data

Jul. 19, 1999 (TW) ........................................ 88112203 A

(51) Int. Cl.[7] .......................................... G02F 1/1339
(52) U.S. Cl. ........................................ 349/155; 349/156
(58) Field of Search ................................. 349/155, 156, 349/113

(56) References Cited

U.S. PATENT DOCUMENTS

| | | | | |
|---|---|---|---|---|
| 5,764,206 A | * | 6/1998 | Koyama et al. | 345/80 |
| 5,767,827 A | * | 6/1998 | Kobayashi et al. | 345/87 |
| 5,831,710 A | * | 11/1998 | Colgan et al. | 349/156 |
| 5,990,988 A | * | 11/1999 | Hanihara et al. | 349/48 |
| 6,016,178 A | * | 1/2000 | Kataoka et al. | 349/117 |
| 6,124,912 A | * | 9/2000 | Moore | 349/113 |
| 6,208,392 B1 | * | 3/2001 | Miller et al. | 349/84 |

* cited by examiner

Primary Examiner—Kenneth Parker
Assistant Examiner—David Chung
(74) Attorney, Agent, or Firm—J.C. Patents

(57) ABSTRACT

A multi-layered thin film protective layer structure, which is applicable for a liquid crystal display with a substrate comprising a peripheral circuit area and a pixel cell area, is described. The pixel cell area and the peripheral circuit area comprise a plurality of pixel cells and metal layers, respectively. The multi-layered thin film protective layer also includes a protective layer in the peripheral circuit area to cover the metal layers and a plurality of pad spacers in the pixel cell area and the peripheral circuit area. The pad spacers are higher than the first protective layer. The structure also comprises a second protective layer in the pixel cell area to cover the pixel cells, wherein the second protective layer has a higher reflectivity to allow the transmission of light to reach the pixel cells and a reflection of light.

6 Claims, 5 Drawing Sheets

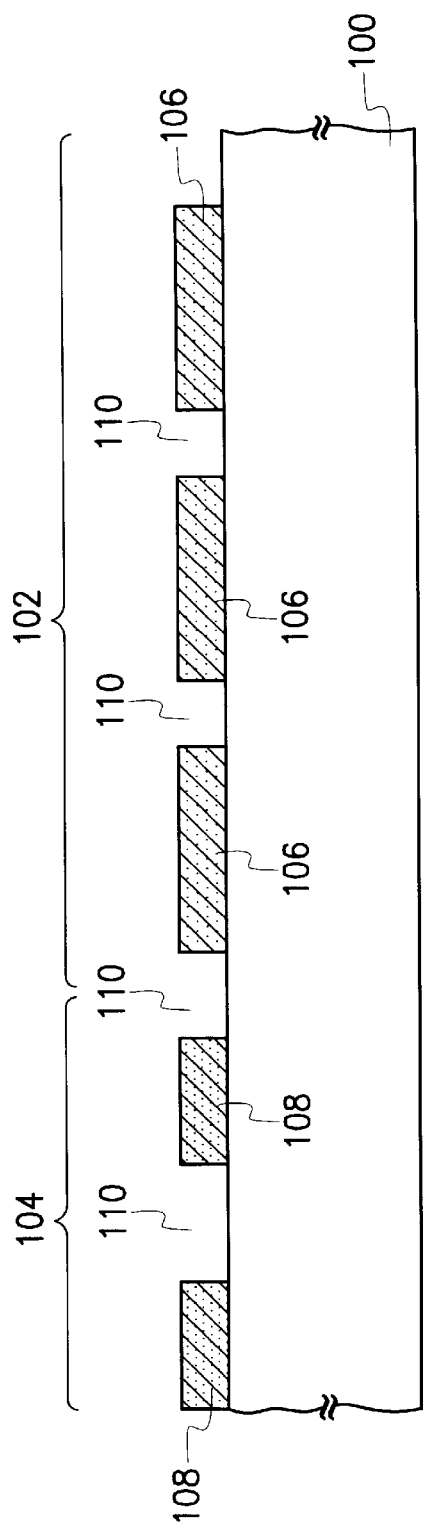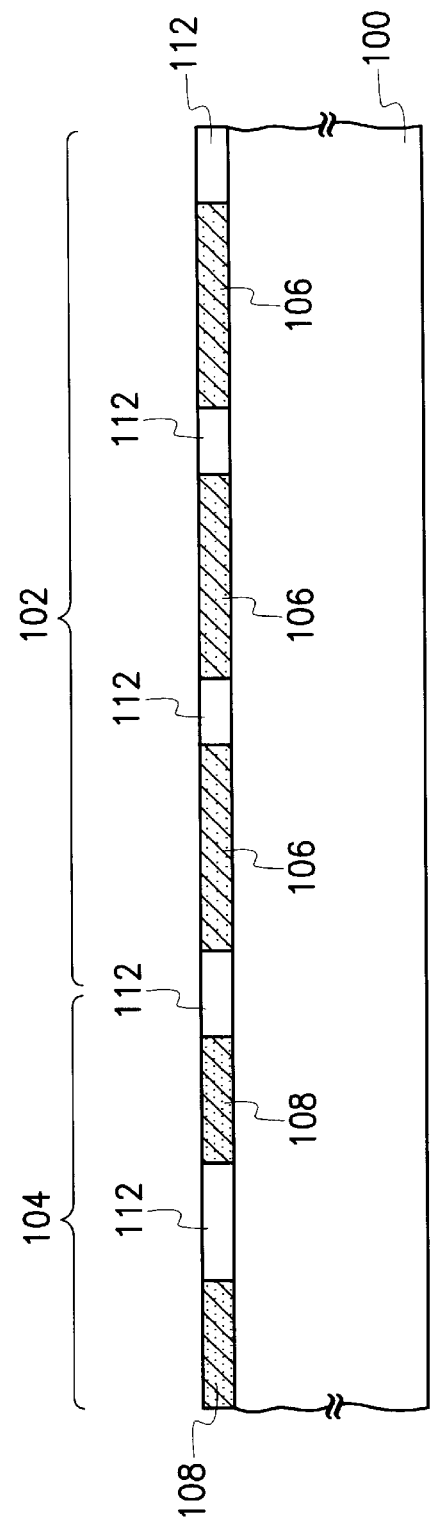

STRUCTURE OF A MULTI-LAYERED THIN FILM PROTECTIVE LAYER

CROSS-REFERENCE TO RELATED APPLICATION

This application claims the priority benefit of Taiwan application serial no. 88112203, filed Jul. 19, 1999.

BACKGROUND OF THE INVENTION

1. Field of the Invention

This invention relates to a structure of a protective layer. More particularly, the invention relates to a structure of a multi-layered thin film protective layer of a reflective micro liquid crystal display ($\mu$-LCD) device.

2. Description of the Related Art

The operation of a reflective micro-LCD device is based on application of a voltage to the metal layer on the surface of a control circuit. The electric field is generated to control the orientation of the liquid crystal. As light transmits through the liquid crystal and reaches the metal layer, the metal layer reflects the light, which in turn transmits through the liquid crystal. The different orientations of the liquid crystal display different optical properties, thereby displaying in different images on the reflective $\mu$-LCD.

During the packaging of the reflective $\mu$-LCD device, filling the liquid crystal requires coating a spacer between the glass plate and the device wafer to separate the glass plate and the device wafer. In addition, a protective layer is formed on the metal layer of the device surface to protect the underlying device.

The spacer, however, can only be coated on the periphery of the device, and the glass plate supported by the spacer bends easily at the center of the glass plate due to stress. As a result, while filling the liquid crystal, the thickness of the liquid crystal cannot be uniform. A Newton's ring thus results. The non-uniform thickness of the liquid crystal seriously affects the quality of the display. Not only the displaying color is change, but the differentiation between the shades of color is also reduced.

The metal layer of the device requires a protective layer to prevent the metal surface from moisture penetration and from being scratched. The structure of the protective layer and the combination of thicknesses of the thin films directly affect the reflection property of the metal layer. The structure of the protective layer is therefore very critical for a reflective micro-LCD device.

SUMMARY OF THE INVENTION

In the light of the forgoing, the present invention provides protective layers of various structures to satisfy the needs of the different protective layers for the different device areas.

In addition, the present invention provides a protective layer structure as a spacer, which is located in the device wafer to support the glass plate and the device wafer and to improve the Newton's ring effect.

The present invention also provides a structure of a multi-layered thin film protective layer, which is applicable to a substrate of a reflective micro-liquid crystal display, wherein the substrate includes a pixel cell area and a peripheral circuit area, and with each area comprising pixel cells and metal layer s, respectively. The structure of the multi-layered thin film protective layer includes a first protective layer formed in the peripheral circuit area and covering the metal layer and a plurality of pad spacers which are formed in the pixel cell area and the peripheral circuit area. The first protective layer includes a silicon nitride layer/oxide layer structure and the pad spacers include an oxide layer/silicon nitride layer/oxide layer structure, wherein the pad spacers are higher than the first protective layer. The structure of the multi-layered thin film protective layer further includes a second protective layer, formed in the pixel cell area covering the pixel cells, wherein the second protective layer includes a thin oxide layer.

The present invention accommodates the needs of different protective layers for the various device areas. A protective layer, which prevents moisture penetration and scratching, is formed to protect the device from being damaged. In the area that requires a high reflectivity, a protective layer with a high reflectivity is formed to fulfill the product requirement. In addition, pad spacers are formed on the device wafer, wherein the pad spacer is higher than the protective layer to facilitate the filling the liquid crystal and to lower the stress generated in packaging, thereby preventing the occurrence of the Newton's ring effect. The thickness of the liquid crystal is therefore more uniform, and the resulting liquid crystal device has a better capability of differentiating the various shades of color.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIGS. 1A to 1F are schematic, cross-sectional views showing the progression of the formation of the multi-layered protective layer for a reflective micro-LCD device.

DESCRIPTION OF THE PREFERRED EMBODIMENT

The function varies for the different device areas of the reflective micro-LCD, thereby mandating different protective layer structures. The conventional protective layer structure of a silicon nitride layer/silicon oxide layer has the functions of preventing scratching and moisture penetration. For the pixel cell area of a reflective $\mu$-LCD device, the reflectivity of the silicon nitride layer/silicon oxide layer, however, is not acceptable. Therefore, the formation of a silicon nitride layer/silicon oxide layer in the pixel cell area affects the reflectivity of the pixel cells. The peripheral circuit area of a reflective $\mu$-LCD device, on the other hand, still needs to prevent scratching and moisture penetration. The formation of a protective layer with better reflectivity, although able to accommodate the needs of the pixel cell area, cannot, however, prevent the peripheral circuit area form being scratched and penetrated by moisture.

According to the preferred embodiment of the present invention, a multi-layered thin film protective layer structure on a device wafer of the reflective micro-LCD device is provided. A silicon nitride/silicon oxide protective layer is formed in the region that mandates the protection of moisture penetration and scratching, and only a thin oxide layer is formed in the area that requires a higher reflectivity. In another words, different protective layer structures are formed according to the functions of the different device areas. Furthermore, during the formation of the above protective layers, pad spacers are formed and scattered in the device wafer to support the glass plate and the device wafer and to prevent the generation of the stress during the packaging process.

Figure 1C:
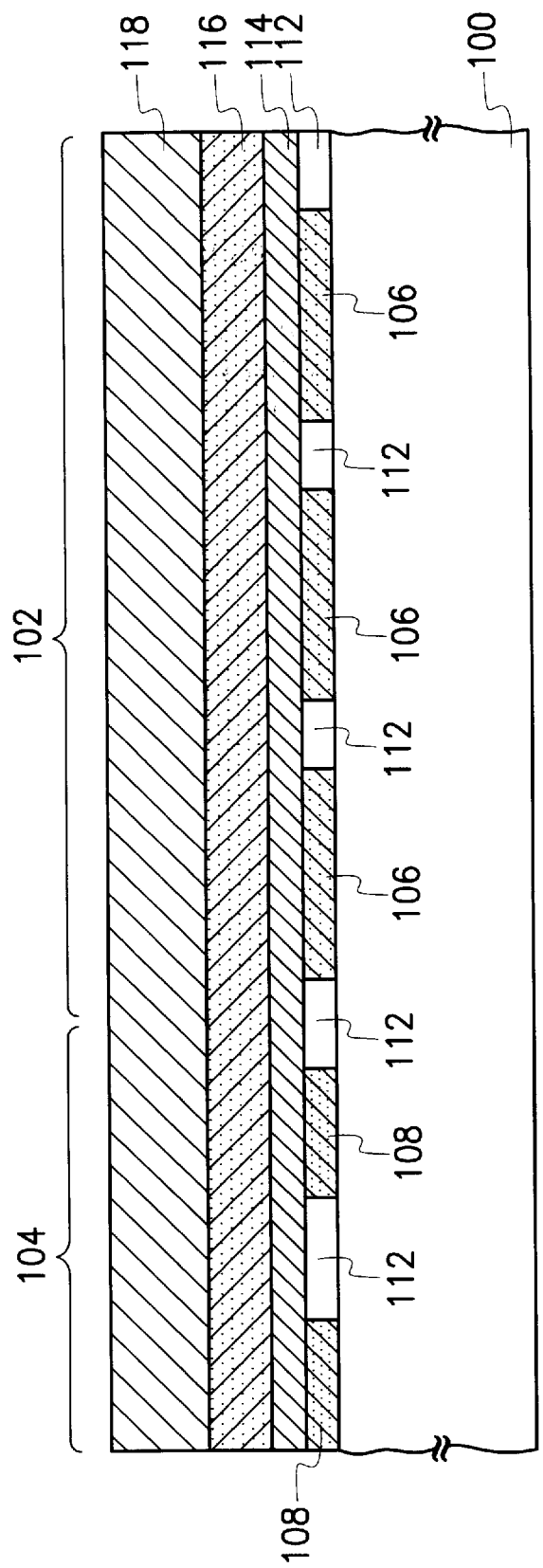

FIGS. 1A to 1F are schematic, cross-sectional views showing the progression of the formation of the multi-layered protective layer for a reflective micro-LCD device. Referring to FIG. 1A, a substrate 100 of a reflective micro-LCD device comprises a pixel cell area 102 and a peripheral circuit area 104. The pixel cells 106 in pixel cell area 102 are formed with a metal material, which is served to connect the circuitry in the substrate 100. The metal layers 108 on the peripheral circuit area 104 are also served to connect the circuitry in the substrate 100. The pixel cells 106 and the metal layers 108 are separated by the mirror layer gaps 110.

The mirror layer gaps are then filled with an insulation material 112 as illustrated in FIG. 1B. The insulation layer 112 is deposited on the pixel cells 106 and on the metal layers 108. The insulation layer 112, for example, an oxide layer formed by high density plasma chemical vapor deposition (HDPCVD), fills the mirror layer gaps 110 and covers the metal layers 108 and the pixel cells 106. The insulation material 112 is then planarized by chemical mechanical polishing and is etched back to expose the pixel cells 106 and the metal layers 108. The insulation material 112 that fills the mirror layer gaps 110 is thereby sufficient to separate the pixel cells 106 from the metal layers 108.

Figure 1D:
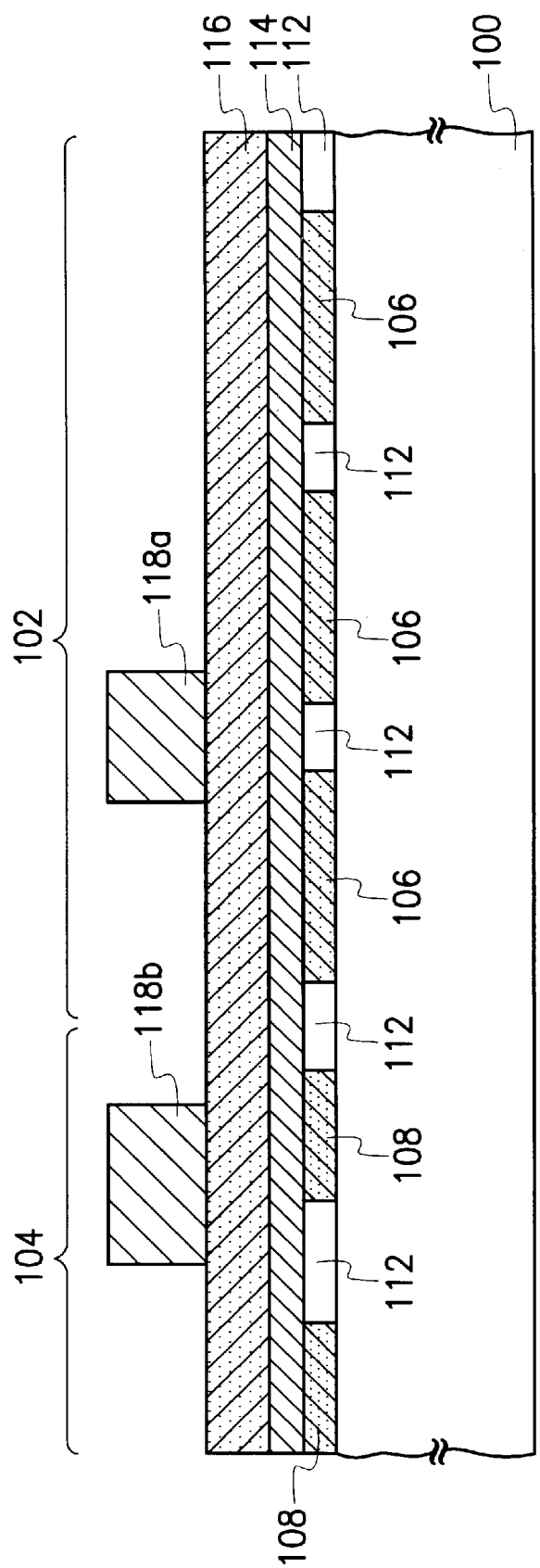
Figure 1E:
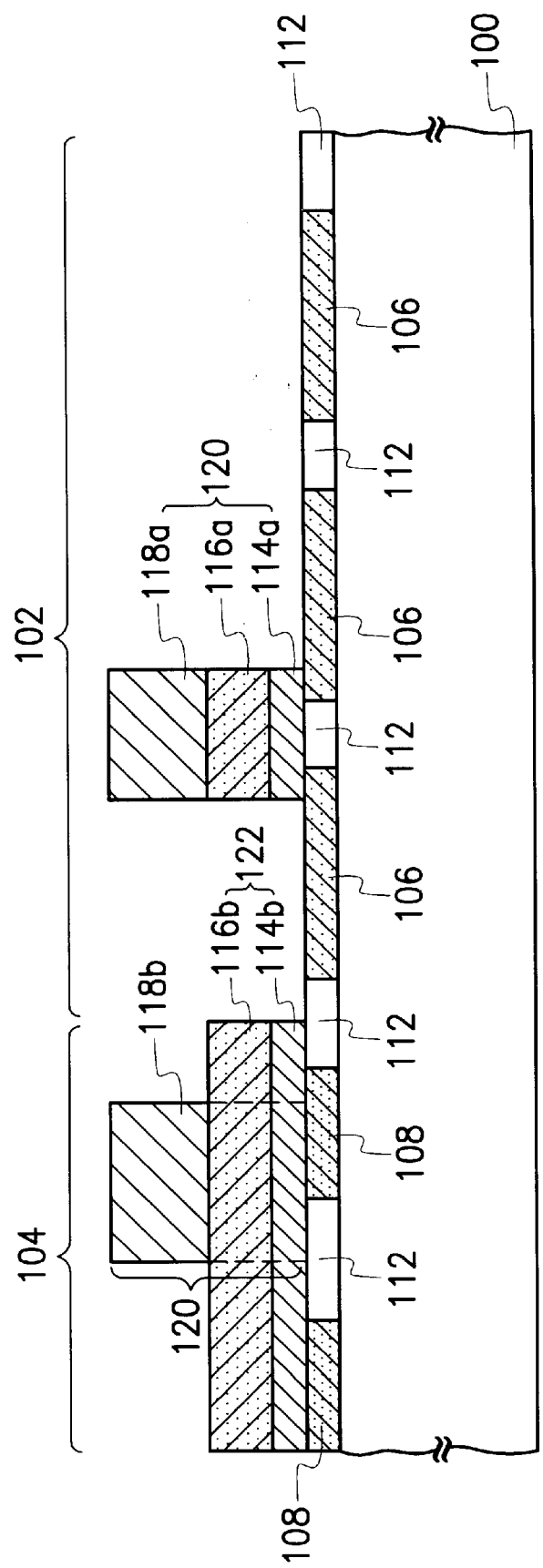

Thereafter, a second protective layer etching process is conducted to define the positions of protective layer in the peripheral circuit area 104 and the pad spacers. Referring to FIG. 1E, the positions for the protective layer 122 of the peripheral circuit area 104 and the pad spacers 120 are formed simply by defining the silicon nitride layer 116 and the oxide layer 114 using photolithography. The pixel cell area 102 mandates a protective layer with a greater reflectivity. The combination of the silicon nitride layer 116 and the oxide layer 114, however, does not have a high reflectivity. The exposed silicon nitride layer 116 and the oxide layer 114 are thus removed in the etching process using the pixel cells 106 as an etch stop. A majority of the pixel cells 106 are then exposed. The pad spacer 120 of the pixel cell area 102 is also defined in this etching process based on the previously defined oxide layer 118a. On the other hand, the peripheral circuit area 104 must be covered with a protective layer to prevent scratching and moisture penetration. The silicon nitride layer 116b and the oxide layer 114b in the peripheral circuit area 104 are retained as the protective layer 122 for the peripheral circuit area 104, which is completed concurrently in the second protective layer etching process. Furthermore, the peripheral circuit area 104 also needs the formation of a pad spacer. As a result, the peripheral circuit area 104 retains a portion of the oxide layer 118b to form a pad spacer 120 during the definition of the oxide layer 118.

A first protective layer etching process is then conducted to define the positions of the pad spacers. As shown in FIG. 1D, by means of photolithography, the oxide layer 118 is defined, followed by an etching of the oxide layer 118 while using the silicon nitride layer 116 as an etch stop. The defined oxide layer 118a, 118b become portions of the subsequently formed pad spacers. The oxide layers 118a, 118b of the pad spacers can be formed on the pixel cell area 102 and the peripheral circuit area 104, respectively.

Thereafter, a second protective layer etching process is conducted to define the positions of protective layer in the peripheral circuit area 104 and the pad spacers. Referring to FIG. 1E, the positions for the protective layer 122 of the peripheral circuit area 104 and the pad spacers 118b and 120 are formed simply by defining the silicon nitride layer 116 and the oxide layer 114 using photolithography. The pixel cell area 102 mandates a protective layer with a greater reflectivity. The combination of the silicon nitride layer 116 and the oxide layer 114, however, does not have a high reflectivity. The exposed silicon nitride layer 116 and the oxide layer 114 are thus removed in the etching process using the pixel cells 106 as an etch stop. A majority of he pixel cells 106 are then exposed. The pad spacer 120 of the pixel cell area 102 is also defined in this etching process based on the previously defined oxide layer 118a. On the other hand, the peripheral circuit area 104 must be covered with a protective layer to prevent scratching and moisture penetration. The silicon nitride layer 116b and the oxide layer 114b in the peripheral circuit area 104 are retained as the protective layer 122 for the peripheral circuit area 104, which is completed concurrently in the second protective layer etching process. Furthermore, the peripheral circuit area 104 also needs the formation of a pad spacer. As a result, the peripheral circuit area 104 retains a portion of the oxide layer 118b as a pad spacer during the definition of the oxide layer 118.

The pad spacer 120 of the pixel cell area 102 is formed by the oxide layer 118a, the silicon nitride layer 116a and the oxide layer 114a. The pad spacer 120 of the peripheral circuit area 104 is formed by the oxide layer 118b and the underlying protective layer 122. The area of the oxide layer 118 a defined in the pixel cell area 102 cannot be too big, for example, approximately 4 microns×4 microns, because a pad spacer 120 with an overly big area affects the reflectivity and the light blocking affect. Furthermore, the pad spacer 120 of the pixel cell area 102 needs to form above the insulation material 112, which is the intersection of the pixel cells 106. As a result, the arrangement and the dimension of the pixel cells 106 in the pixel cell area 102 determine the dimensions of the pad spacer 120.

Because the pad spacers 120 are formed in the cell pixel area 102 and the peripheral circuit area 104, the pad spacers are scattered in the wafer device. These pad spacers 120 are to provide support for the glass plate and the device wafer, and to prevent stresses from being induced during the packaging process, which stress would lead to the occurrence of the Newton's ring while filling the liquid crystal. The thickness of the filled liquid crystal is thus more uniform. Furthermore, the pad spacer 120 comprising the oxide layer 118a/silicon nitride layer 116a/oxide layer 114a is higher than the protective layer 122 to facilitate the filling of the liquid crystal and to determine the thickness of the liquid crystal. The thickness of the oxide layer 118a can vary according to the required thickness of the liquid crystal or the type of products.

Figure 1F:
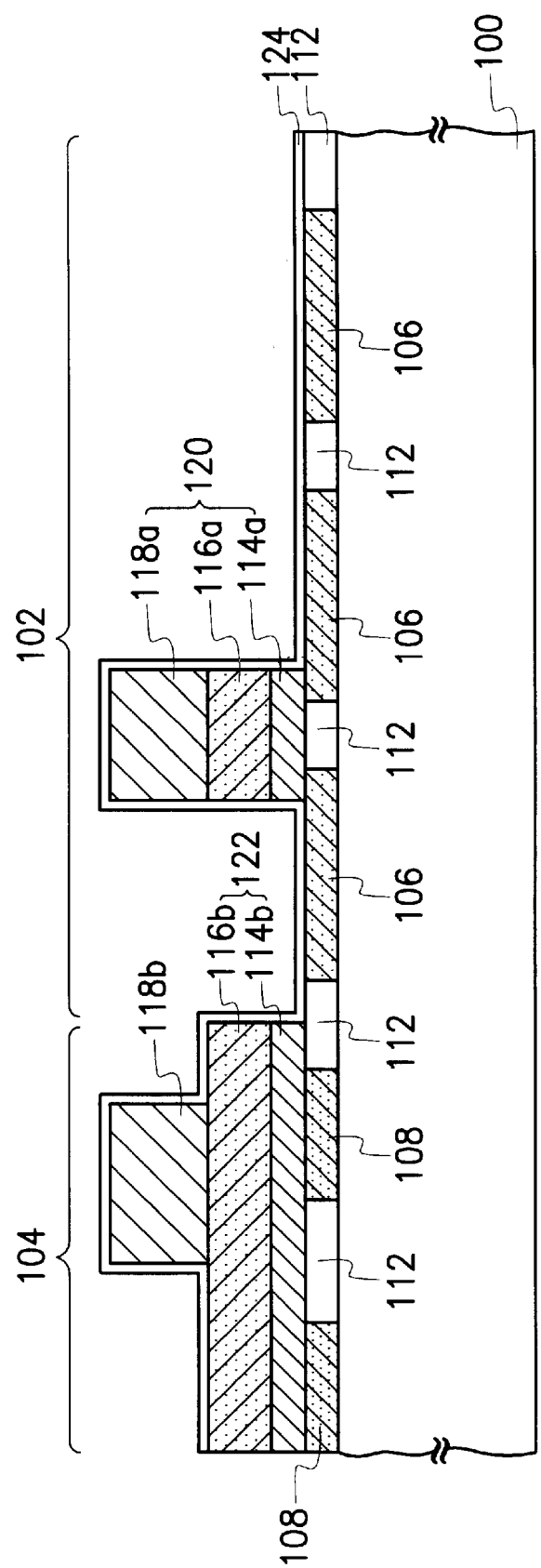

A protective layer 124 with a higher reflectivity is further formed on the substrate 100 as shown in FIG. 1F. The reflectivity of the protective layer 124 is high enough for light to transmit through the protective layer 124 to reach the cell pixels 106 and to reflect back. The protective layer 124, for example, is a thin oxide layer or a combination of the silicon nitride layer/oxide layer. The protective layer 124 covers at least the pixel cells 106 in the pixel cell area 102 and serves as a protective layer for the pixel cells 106. The protective layer 124 can also cover other areas in the substrate 100. The thin oxide layer is, for example, a chemical vapor deposited tetra-ethyl-ortho-silicate (TEOS) layer of approximately 500 Å thick.

Since the reflectivity for the thin oxide layer 124 is approximately 85%, covering the pixel cells 106 with the thin oxide layer 124 does not seriously affect the reflectivity of the pixel cells 106 when the light reaches the pixel cells 106. The thin oxide layer 124 can also provide an appropriate protection for the pixel cells 106.

As illustrated in FIG. 1F, a structure of a multi-layered thin film layer, which is applicable to a substrate 100 of a liquid crystal display, is provided. The substrate 100 comprises a pixel cell area 102 and a peripheral circuit area 104, which further comprises a plurality of pixel cells 106 and metal layers 108, respectively. The structure of the multi-layered thin film layer comprises a first protective layer 122 in the peripheral circuit area 104, covering the metal layers. The structure further includes a plurality of pad spacers 120 in the pixel cell area 102 and in the peripheral circuit area 104, wherein the pad spacers 120 are higher then the first protective layer 122. The multi-layered thin film layer also comprises a second protective layer 124 formed in the pixel cell area 102, covering the pixel cells 106, wherein the second protective layer 124 has a high reflectivity to allow a transmission of light to reach the pixel cells and a reflection of light.

The present invention provides a multi-layer of thin films to accommodate the different demands of the protective layers in the reflective micro-LCD. For example, the structure of a silicon nitride/oxide material serves to protect the peripheral circuit area from moisture penetration and from being scratched. For the pixel cell area, which mandates a high reflectivity, the structure such as an oxide material serves as the protective layer. Furthermore, to facilitate the filling of the liquid crystal, the height of the pad spacers are higher. The pad spacers are structures of an oxide material/nitride material/oxide material, wherein the order of the thin films and their thicknesses can vary accordingly.

The present invention provides a protective layer for the peripheral circuit area to prevent moisture penetration and scratching, and a protective layer for the pixel cell area, which has a high reflectivity. The demand for the different protective layer structures in the different device areas is thus adequately complied. In addition, the pad spacers in the peripheral circuit area and the pixel cell area are provided by the protective layer structure. The pad spacers are scattered on the wafer device to lower the stress effects during the packaging process and to allow a uniform filling of the liquid crystal.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A structure of a multi-layered thin film layer, which is applicable to a substrate of a liquid crystal display, wherein the substrate comprises a pixel cell area and a peripheral circuit area, which further comprises a plurality of pixel cells and metal layers, respectively, the structure comprising:

a first protective layer in the peripheral circuit area to cover the metal layers;

a plurality of pad spacers in the pixel cell area and the peripheral circuit area, wherein the pad spacers are higher than the first protective layer, and a second protective layer in the pixel cell area to cover the pixel cells, wherein the second protective layer has a high reflectivity allowing a transmission of light to reach the pixel cells and a reflection of light, wherein the pad spacers are formed with a first oxide layer, a silicon nitride layer and a second oxide layer.

2. The structure of a multi-layered thin film layer according to claim 1, wherein the second protective layer includes a thin oxide layer.

3. The structure of a multi-layered thin film layer according to claim 1, wherein the reflectivity of the thin oxide layer is approximately 85%.

4. The structure of a multi-layered thin film layer according to claim 1, wherein the second protective layer is approximately 500 Å.

5. The structure of a multi-layered thin film layer according to claim 1, wherein the second protective layer includes tetra-ethyl-ortho-silicate.

6. The structure of a multi-layered thin film layer according to claim 1, wherein the first protective layer is formed with a first oxide layer and a first silicon nitride layer.

* * * * *